April 8, 1969      A. SIKSAI      3,437,401

LIGHT-INTERCEPTING SHEET FOR AN ILLUMINATED DISPLAY DEVICE

Filed May 25, 1964

INVENTOR.
Anthony Siksai
BY Lane, Aitken, Dunner & Ziems
ATTORNEYS

INVENTOR.
Anthony Siksai.
BY
Lane, Aitken, Dunner & Ziems
ATTORNEYS

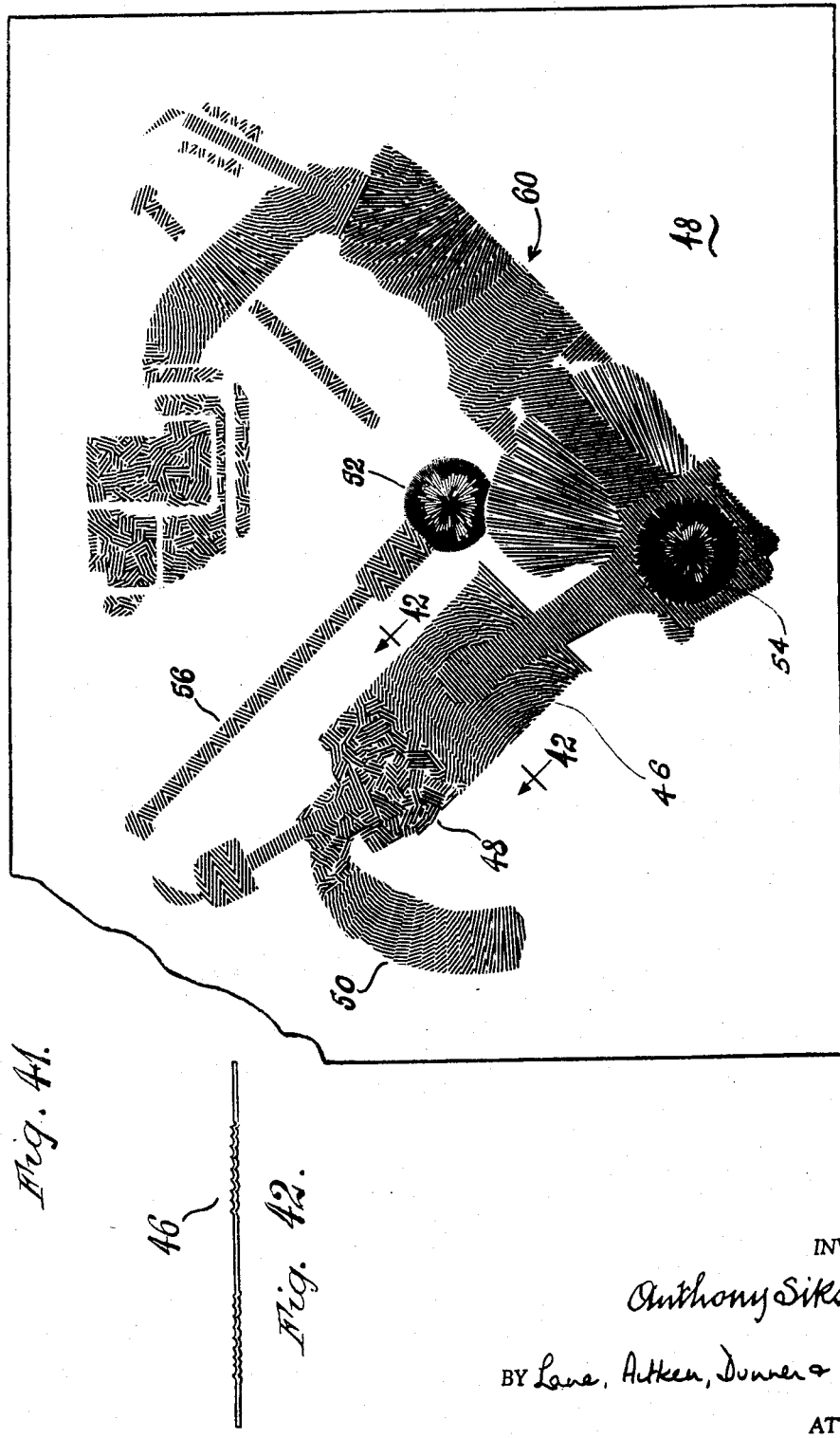

United States Patent Office 3,437,401
Patented Apr. 8, 1969

3,437,401
LIGHT-INTERCEPTING SHEET FOR AN ILLUMINATED DISPLAY DEVICE
Anthony Siksai, Bloomfield Township, Oakland, County, Mich., assignor to Visorama Printed Motions Company, Detroit, Mich., a corporation of Michigan
Continuation-in-part of application Ser. No. 197,128, May 23, 1962. This application May 25, 1964, Ser. No. 369,942
Int. Cl. G02b 5/30, 27/28; G02f 1/24
U.S. Cl. 350—159        19 Claims

ABSTRACT OF THE DISCLOSURE

A display device for animating selected portions of a picture comprising a rotary polarizer and a light-intercepting sheet having different patterns of motion lines imprinted on the portions thereof overlying the portions of the picture to be animated. The motion lines are imprinted on the light-intercepting sheet by a master plate or die which enables a large number of light-intercepting sheets to be produced on a production basis.

---

This application is a continuation-in-part of my copending application Ser. No. 197,128, filed on May 23, 1962, now abandoned.

The present invention relates to animated displays and methods of making animated displays, and more particularly to a light-intercepting sheet for animating a picture, chart, poster, or the like.

Prior to the present invention animated displays have been made which comprise a transparency having the picture to be animated painted on one face thereof. A rotatable disc made from a sheet of polarized material which is commonly referred to as a polarizer is positioned behind the transparency and a suitable light source is positioned behind the polarizer to pass light through the polarizer and transparency. A stationary sheet of polarized material commonly referred to as an analyzer is interposed between the transparency and rotatable disc. With this arrangement the transparency alternately appears bright and dark each time the polarizer rotates through 90° because maximum light passes through the transparency when the polarizing axes of the polarizer and analyzer are aligned with one another and minimum light passes through when the polarizer rotates 90° so that the axes are at right angles to one another.

To animate parts of the transparency, according to one teaching of the prior art as disclosed in the patent to Yates 3,054,204 granted on Sept. 18, 1962, the analyzer is replaced by a sheet from a plurality of separate pieces of polarized material each having it polarizing axis oriented at a progressively varying angle relative to the preceding piece. The polarized pieces also are arranged in different groups with configurations corresponding to portions of the transparency which they overlie. The result, to one viewing the transparency from its front face is an appearance of traveling shadows or motion given to the portions of the transparency overlying the groups of polarized pieces when the polarizer is rotated.

According to another arrangement of the prior art as disclosed in the patent to Burchell et al., 2,393,968, granted on Feb. 5, 1946, a plurality of separate pieces of birefringent material, such as Scotch tape, are arranged on a transparent sheet so as to be oriented at progressively varying angles. The sheet is then interposed between an analyzer and polarizer and functions in a manner analogous to the previously mentioned sheet of polarized pieces to animate the desired portions of the transparency. However, in both of these prior art arrangements, separate pieces of polarized or birefringent material must be cut and painstakingly assembled for each animated display in patterns or groups corresponding in configuration to the portions of the transparency to be animated. This obviously is an expensive and time-consuming process which has retarded the widespread use of these animated displays.

In accordance with the present invention it has been discovered that a light intercepting stress pattern can be produced in a sheet of optically inactive (isotropic) material, such as a transparent plastic sheet, and in some optically active materials, such as some birefringent plastic materials, by a suitable embossing plate and that when the light-intercepting sheet is interposed between a polarizer and analyzer, desired portions of the transparency can be animated as in the prior art arrangements. The embossing plate must have the embossed lines accurately formed thereon in the necessary patterns for animating selected portions of the transparency; however, once the embossing plate is made, large numbers of sheets can be embossed with the light-intercepting stress pattern on a production basis.

When the aforementioned embossing plate is pressed against a sheet of isotropic material to emboss the lines thereon, the molecular structure of the sheet undergoes a localized orientation along small invisible stress lines in the sheets generally perpendicular to the embossed lines. When sheets of birefringent material are embossed, the existing molecular orientation is changed and the molecules are directionally reoriented along the aforementioned stress lines created by the embossing operation. In either case, the embossed light-intercepting sheets can be substituted for the prior art composite sheets made from strips of polarized or birefringent material, and will cooperate with a light source, rotating polarizer and analyzer to animate transparencies just as well as the more expensive composite prior art sheets.

Accordingly, it is one object of the present invention to provide an animated display of the type described above which eliminates the need for painstakingly assembling separate pieces of polarized or birefringent material for each display.

It is another object of the invention to provide a light intercepting sheet having a light intercepting pattern of stress lines embossed thereon which can cooperate with a rotating polarizer and light source to animate portions of a transparency, picture, chart, or the like.

It is a further object of the invention to provide methods for making plates for embossing light intercepting patterns of stress lines on sheets of material for use in animated displays.

It is a still further object of the invention to provide a light intercepting sheet comprising a single layer of material having a light intercepting pattern of stress lines embossed on areas of one face thereof and the portions of the other face thereof overlying the embossed areas polarized by polarizing ink.

It is a still further object of the invention to provide a plurality of motion sheets each having a different pattern of motion lines thereon to produce distinctive motions, such as, for example, linear motion, reciprocating motion, scattered motion, circular motion, radiating and so forth.

It is a still further object of the invention to provide methods for making master sheets having different patterns of motion lines thereon arranged to produce a desired animation, the master sheets being photographically reproducible on an embossing or imprinting plate which, in turn, can be used to emboss or imprint light intercepting sheets for use in animated displays.

Other objects and features of novelty of the present invention will be specifically pointed out or will otherwise become apparent when referring, for a better understanding of the invention, to the following description taken in conjunction with the accompanying drawings, wherein:

FIG. 41 is a plan view of a light interceptor sheet for animating portions of a picture of a gasoline engine in cross section;

FIG. 42 is a sectional view taken along the line 42—42 of FIG. 41; and

Figure 1:
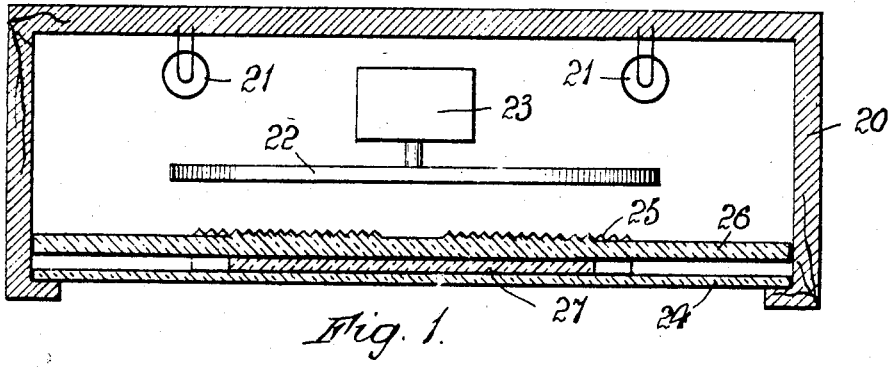
FIG. 1 is a sectional view of a display device embodying features of the invention.
Figure 2:
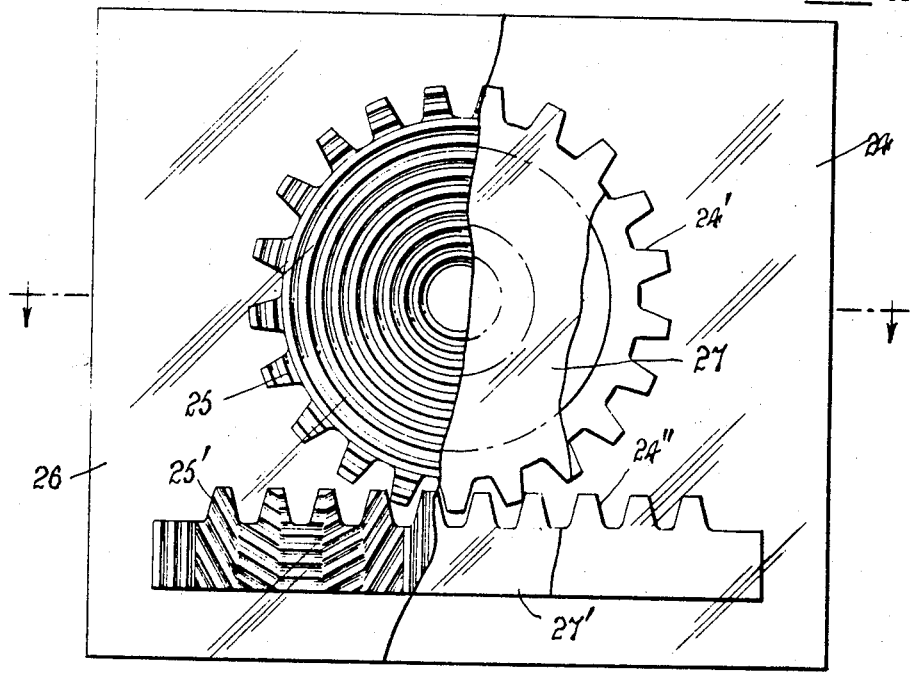
FIG. 2 is a rear view of the superimposed light intercepting sheet, analyzer, and transparency, with parts of the light intercepting sheet and analyzer partially broken away, the spacing of the embossed lines being exaggerated for the sake of clarity.

Referring to FIGS. 1 and 2 an animated display device is shown which illustrates features of the invention. For the sake of clarity, the thickness of the various elements and the spacing and width of the embossed or otherwise formed lines of the light-intercepting sheet have been exaggerated. The animated display comprises a light box 20 having a rectangular opening in the front face thereof. An electric motor 23 is mounted within the light box 20 for rotating a polarizing disc 22 mounted on the end of the drive shaft of the motor, and a pair of light bulbs 21 is mounted behind the rotatable disc 22 to pass light therethrough. A transparency 24 having the design or art work to be animated is positioned over the opening in the front face of the light box. In this embodiment, the transparency 24 has a gear 24' and rack 24" (FIG. 2) painted thereon which are to be animated by lending the appearance of rotations to the gear and linear movement to the rack. The transparency may be any suitable transparent or translucent sheet material such as glass, plastic or paper through which light can pass and upon which the design or art work to be animated can be applied in a suitable manner, such as by drawing, photographic proceses, printing, lithographic processes, coloring and so forth.

A gear 27 and rack 27' are cut out from a sheet of light polarizing material and positioned behind the transparency 24 overlying the gear and rack thereon. The polarized gear and rack are preferably bonded to the transparency by a suitable transparent adhesive. A light-intercepting sheet 26 is positioned behind the polarized gear 27 and rack 27' and is also preferably bonded thereto by a suitable transparent adhesive. As most clearly illustrated in FIG. 2 the portion of the light-intercepting sheet 26 overlying the polarized gear 27 has a plurality of concentric rings embossed thereon to form an embossed gear 25, and the portion of the light intercepting sheet overlying the polarized rack 27' has a pattern of lines at progressively varying angles embossed thereon to form an embossed rack 25'. The light intercepting sheet 26 is preferably made from a suitable material such as vinyl acetate, cast acetate, Tenite acetate, or the like, Tenite acetate being a cellulose aceto-butyrate plastic sold under the trade name Tenite. Each of these materials becomes optically active (exhibits birefringence) when exposed to certain physical influences such as force, temperature change or the combined application of such physical influences.

With the arrangement of FIG. 1, the polarizing disc 22 functions as the polarizer and the polarized gear 27 and rack 27' act as the analyzer. As the polarizing disc 22 rotates, the gear 24' and rack 24" on the transparency 24 will appear to rotate and move linearly respectively, just as effectively as in the prior art arrangements discussed at the beginning of this application. Embossing the gear and rack on the surface of the light intercepting sheet causes the embossed surface to exhibit birefringence. This phenomenon may be termed forced birefringency since it is believed that the pressure of the embossing operation causes the molecular structure of the material to undergo localized reorientation along the stress lines in the material created by the force applied to form the embossed lines. This causes double refraction in an isotropic material along controlled lines so that it in effect exhibits birefringence. Of course if the sheet is made from birefringent material, the already existing lines of stress will be directionally reoriented by the embossing operation. This is a complicated phenomenon which is difficult to understand; however, at this point it will suffice to consider that a molecular orientation takes place in the light intercepting sheet during the embossing operation and the pattern of this molecular orientation is determined by the pattern of the embossed lines.

If the light intercepting sheet 26 were eliminated, it is apparent that the gear 24' and rack 24" on the transparency 24 merely would brighten and darken twice each revolution. The brightness would occur each time the major axis of the disc's polarizing crystals is parallel with the major axis of the polarizing cyrstals of the gear 27 and rack 27' and the darkness would occur each time the major axis of the disc is crossed at 90° relative to the major axis of the polarized gear and rack. By interposing the light intercepting sheet 26 between the polarizer and analyzer the 90° bright-dark phenomenon is altered to give the appearance of flowing shadows or movement to the art work on the transparency. Referring to FIG. 2 at a predetermined position of the polarizer relative to the analyzer the portions of the transparency rack 24" overlying the vertical lines of the embossed rack 25' will have the most light passing therethrough, the portions overlying the embossed lines which are just off the vertical will have less light passing therethrough, the portions overlying the embossed lines just off the horizontal will have still less light passing therethrough and the portions overlying the horizontal embossed lines will have the least light passing therthrrough. As the polarizer rotates from this predetermined position, this spread of light intensity progressively varies from one portion of the rack to the other to give the appearance of linear motion to the transparency rack 24″.

Similarly, the embossed gear 25 formed on the light intercepting sheet 26 by the concentric rings gives the appearance of rotation to the transparency gear 24′. At one predetermined position of the polarizer the portions of the gear along two diameters perpendicular to one another will appear to be brightest, and the portions of the gear along the two diameters midway between these two will appear to be the darkest with all portions in between progressively varying in light intensity. As the polarizer rotates this condition continuously changes to give the appearance of rotation to the transparency gear 24′.

Figure 3:
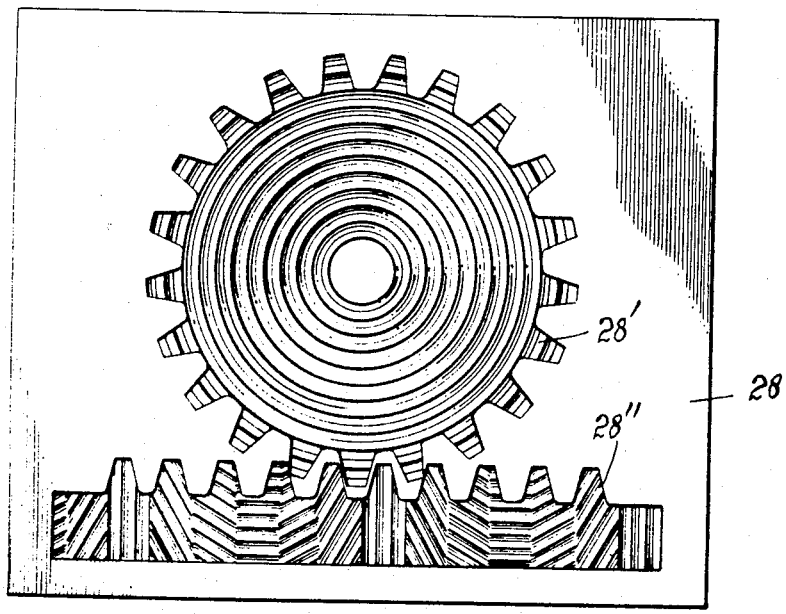
FIG. 3 is a view of the face of a suitable plate for embossing the light intercepting sheets.
Figure 15:
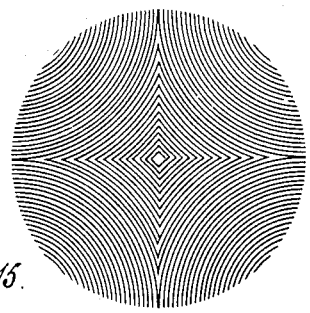
FIGS. 14–40 illustrate additional patterns of lines for producing various motions.

The advantage of the embodiment illustrated in FIGS. 1 and 2 is that the motion lines forming the embossed gear 25 and rack 25′ can be embossed on a layer of suitable isotropic or birefringent material by an embossing plate to form the light intercepting sheet 26 in a simple and economical manner as described at the beginning of the specification. An embossing plate 28 for embossing the gear 25 and rack 25′ is illustrated in FIG. 3. It has a gear 28′ formed thereon by alternating raised and depressed concentric rings and a rack 28″ formed thereon by ridges and grooves arranged in adjacent strips or sectors with the angle of the ridges and grooves of each sector progressively varying from the preceding sector as illustrated. The embossed gear and rack may be formed on the embossing plate 28 by a photoengraving process, as will be described hereinafter, or any other suitable manner, including forming the lines with a hand tool if desired.

When embossing the pattern of lines on the light intercepting sheet, the embossing plate is preferably heated to a working temperature below the flow temperature of the material of the sheet being embossed to facilitate the embossing operation. The particular force or pressure applied should be just under the flexural strength of the sheet material at the temperature employed. Three particularly suitable plastic materials which may be employed to form the light intercepting sheets have been mentioned above; namely, vinyl acetate, cast acetate and the cellulose aceto-butyrate plastic sold under the the trade name Tenite acetate. In making the light intercepting sheet 42 illustrated in FIG. 41, which will be described in greater detail hereinafter, a Tenite acetate sheet having a thickness of about .01 inch was employed along with a temperature of 250° to 275° F. and a pressure between 6,000 to 10,000 pounds per square inch. The actual embossing pressure for a given material must be coordinated with the temperature and the time the embossing pressure is applied, and a workable combination for a given material will determine the quality as well as production time of the individual light intercepting sheets. The nature of the sheet material used is the determining factor in arriving at the temperatures and pressures to be employed in the embossing process.

It is noted that atoms subjected to a temperature change (heating or cooling) and/or a formative or distortive effect will exhibit polarization. Materials exposed to formative forces will undergo a change physically so that the distance between the nucleus and the orbiting electron or electrons will change thus creating a different electric moment than that of the normal for the specific atom. Also an increase in heat creates polarization in atoms. However, in the process of the present invention it is believed that the primary purpose of the heat is to act as a softening agent to facilitate the force application and that the molecular orienation which takes place along the stress lines produced in the isotropic or birefringent material is primarily due to the application of the embossing force or pressure itself. Therefore, where the nature of the material will admit, the embossing pressure can be exerted on the material in a cold state, although as already stated heating the embossing plate to facilitate the embossing operation is preferred.

Figure 4:
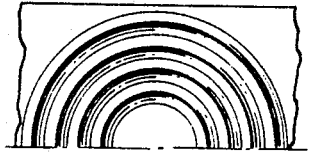
FIGS. 4–9 illustrate several examples of light intercepting sheets having different patterns embossed thereon to obtain various effects or shadow flow when used in a display device as illustrated in FIGS. 1–3, the spacing of the lines again being exaggerated for the sake of clarity.
Figure 5:
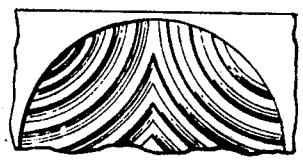
Figure 10:
FIGS. 10–13 illustrate, in cross section, examples of various types of ridges or indentations which may be embossed, inscribed or molded to form the various patterns on the light interception sheets, such as the pattern of FIG. 4 for example.
Figure 11:
Figure 6:
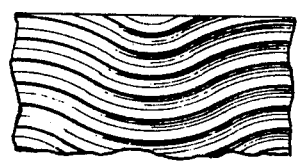
Figure 12:
Figure 13:
Figure 7:
Figure 8:
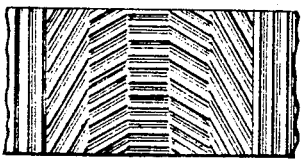
Figure 9:
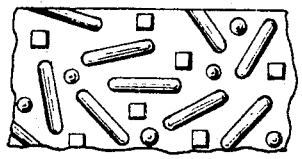

Referring to FIG. 4 a portion of a light intercepting sheet is illustrated having embossed concentric rings thereon for producing circular motion when interposed between a polarizer and analyzer as in the case of the gear in FIGS. 1 and 2. FIG. 5 illustrates a light intercepting sheet having a pattern of lines which will produce a unique circular sweeping motion in each of the quadrants with the centers of sweep at the center of curvature of each group of curved lines. The pattern of FIG. 6 will result in a wavering or fluctuating shadow flow and the pattern of FIG. 7 wherein the lines form angles of about 90° will produce a blinking or off and on effect. The pattern of FIG. 8 will produce linear movement as described in connection with the rack illustrated in FIGS. 1 and 2 and the pattern illustrated in FIG. 9 will produce a scattering or scintillating effect.

Additional patterns of lines are illustrated in FIGS. 14–19 for producing different types of motions. The lines of FIGS. 14 and 17 will each produce a rotary motion, and the lines of FIG. 16 will produce an oscillating or back and forth rotary motion. It will be observed in FIG. 16 that the pattern of the oriented sectors 40 repeats itself each 180° and that each diametrically opposed pair of oriented sectors is identical. The lines of FIG. 15 will produce the same motion as FIG. 5, and the lines of FIGS. 18 and 19 produce the same linear and wavering motion as FIGS. 8 and 6, respectively.

Figure 16:
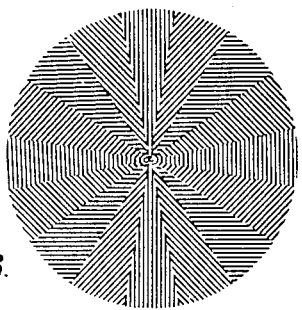
Figure 17:
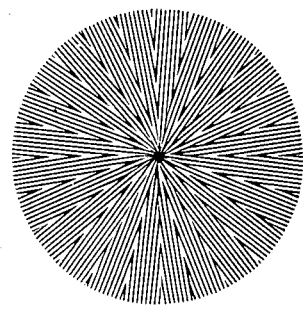
Figure 18:
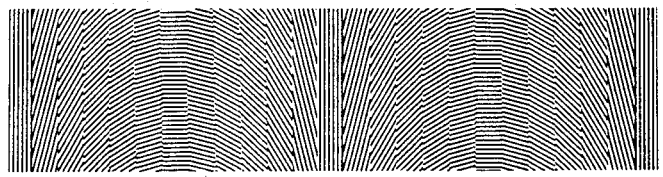
Figure 19:
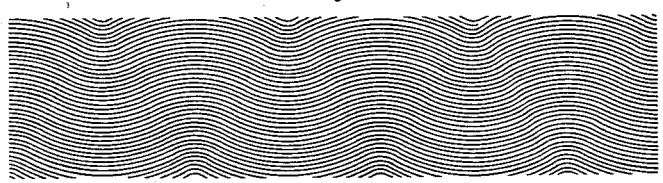

Referring specifically to FIG. 18, it will be observed that the oriented sectors 40 are in the form of strips, rather than pie-shaped as in FIG. 16, with the angle of the lines in each sector progressively varying. The speed of the linear motion produced by the pattern of FIG. 18 will depend on the number of sectors employed between the sectors having the vertical lines. For example, if the number of sectors is increased so that the angular variation between the lines of each adjacent sector is reduced, the resulting motion will appear to be faster and smoother.

Any of the motion line patterns of FIGS. 14–19 can be embossed on embossing plates by a photoengraving process. For example, the pattern of FIG. 14 may be hand-drawn on a sheet of paper and photographed. The photographic negative can then be employed in a conventional photoengraving process to produce a plate having the concentric rings embossed or engraved thereon. If desired, the sheet of paper having the motion lines printed thereon (hereinafter referred to as a motion sheet) can be made larger than required so that a much finer spacing of lines can be engraved on the plate by reducing the size of the photographic negative of the motion sheet. Thus, very fine lines can be engraved on the plate with little trouble, and large numbers of light intercepting sheets can be embossed with these fine lines accurately and uniformly. Moreover, with the photographic reduction step, it is possible to employ small oriented sectors of very fine lines in a particular animating arrangement which would be very difficult, if not impossible, to obtain by the prior art arrangements wherein strips of light intercepting material were manually assembled to form the oriented sectors. Obviously there is a definite limitation as to the width of such strips which can be handled and assembled by an expert using the prior art techniques. Further, by employing a larger number of oriented sectors as compared to the prior art arrangements, the angular variation between adjacent oriented sectors can be reduced to produce a smoother shadow flow because the optical angular "jump" from one oriented sector to the next is accordingly reduced. In fact, curved lines can be used for the first time to completely eliminate "jump," and more complicated and varied motions can be produced, and smaller pictures or art work can be animated effectively and economically.

Figure 14:
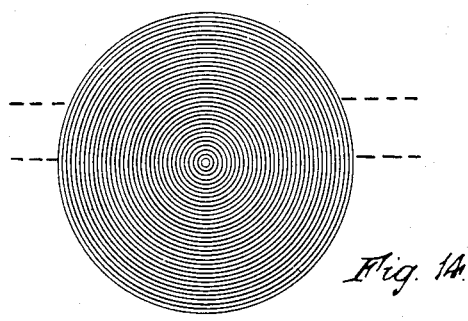
Figure 43:
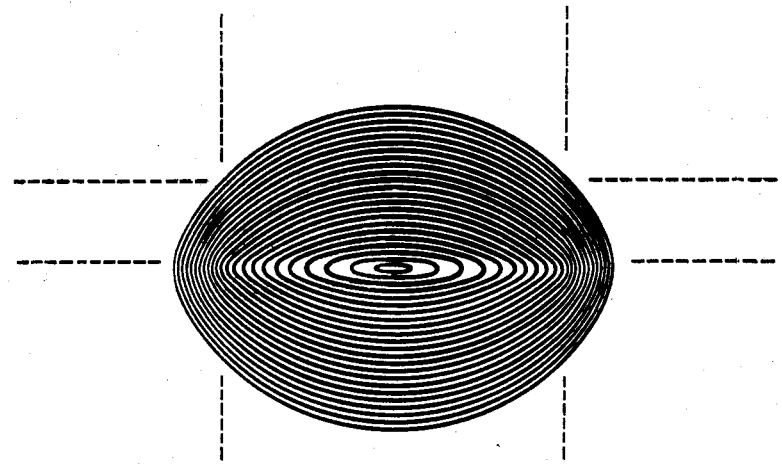
FIG. 43 is a view of a motion sheet made by photographically distorting the concentric ring pattern of FIG. 14.
Figure 20:

Linear motion such as that produced by the motion lines of FIG. 18 also can be produced by the chordal strip between the dotted lines in FIG. 14. For example, to produce the embossed rack 25′ illustrated in FIG. 2, the chordal strip could be cut from a motion sheet having the concentric motion lines of FIG. 14, the chordal strip thereafter cut in the shape of the rack, and photographed and engraved on the embossing plate 28 by a photoengraving process. If the chordal strip were not long enough, additional chordal strips could be cut to make up the desired length before photographing. Also the motion sheet having the concentric motion lines of FIG. 14 can be photographically distorted to produce an eliptical motion sheet as illustrated in FIG. 43 which then can be cut along the major axis thereof with the two halves positioned side by side as illustrated in FIG. 20 to form a motion sheet for producing linear motion as in FIG. 18. However, the continuous curvature of the motion lines of FIG. 20 will produce a smoother shadow flow than the lines of progressively varying angles in FIG. 18. If desired, the eliptical motion sheet of FIG. 43 can be cut along its minor axis and then assembled in side by side relationship as in FIG. 20. This will produce a faster linear motion than that of FIG. 20.

Thus a light intercepting sheet can be embossed with curvilinear lines to produce a large variety of motions which are smoother than the angularly oriented sectors used in the rack 25′ of FIG. 1. It is also apparent that it is quite impossible to make such curvilinear lines using the teaching of the patents to Yates or Burchell et al. referred to at the outset of the specification since this would require eliminating the sequentially arranged, angularly oriented polarized and/or birefringent strips.

Another method of making the rack on the embossing plate 28 would be to draw by hand the motion lines of FIG. 18, for example, to produce a motion sheet, cut out the rack configuration and photograph it (reduced size if desired), and engrave the rack on the embossing plate 28 by a photoengraving process. Still another method would be to start with a sheet of paper having parallel, opaque lines spaced the desired distance apart, cut this paper into strips to form the various sectors 40 illustrated in FIG. 18, assemble the strips on a support sheet in the oriented relation illustrated in FIG. 18 to form a motion sheet, cut the motion sheet in the form of the rack, photograph it (reduced in size if desired) and engrave it on the embossing plate 28 by a photoengraving process.

Figure 26:
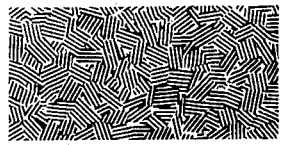
Figure 27:

Another very important advantage of the present invention is that large numbers of motion sheets can be printed in advance for each of the different motions described to facilitate making light intercepting sheets for more complicated animated displays. The outline of the picture or art work to be animated can be drawn on a master sheet and the configuration of each of the portions to be animated can be cut from the particular motion sheet having the desired motion and glued in place on the master sheet. For example, if the picture on the transparency is a cross-sectional view of an internal combustion engine and one of the parts to be animated is the combustion chamber, the configuration of the combustion chamber can be cut from the motion sheet having the scattered pattern of FIG. 26 and positioned on the master sheet. If the piston within the combustion chamber is to have the appearance of moving linearly, the configuration of the piston can be cut from the motion sheet having the linear motion pattern of FIG. 18 and positioned on the master sheet. If a crankshaft is to be given the appearance of rotation, a circle of the appropriate diameter may be cut from the motion sheet having the circular motion pattern of FIG. 14 and positioned on the master sheet, and so forth. The master sheet then can be photographed, being reduced in size if necessary, and a photoengraving process employed for making the appropriate embossing plate for embossing the overall light intercepting patterns of motion lines on individual light intercepting sheets to be employed in the animated displays.

A more sophisticated light intercepting sheet 42 for animating a transparency of an internal combustion engine in cross section as just described is illustrated in FIG. 41. Some of the animated parts of the engine 60 which are readily recognizable are the piston 46 having the linear motion pattern of FIG. 18, the combustion chamber 48 having the scattered motion pattern of FIG. 26, and the intake manifold line 50 having the linear motion pattern of FIG. 18. The cam shaft 52 and crankshaft 54 have a rotary motion formed by radial lines, and the valve lifting rod 56 has a reciprocating motion pattern formed by alternate strips of vertical lines and 45° lines. The light intercepting sheet 42 is made of Tenite acetate and has a thickness of approximately .01 inch. Because of the thinness of the sheet, the embossed patterns of motion lines appear on both faces of the sheet as can be seen from the cross-sectional view illustrated in FIG. 42.

If desired the analyzer (the stationary polarizing sheet) can be bonded to one face of the light intercepting sheet 42 by a suitable transparent adhesive and the sheet having the entire internal combustion engine painted thereon can be bonded to the analyzer by a transparent adhesive. The resulting three-ply lamination can be positioned in the light box 20 illustrated in FIG. 1 and the portions of the engine overlying the various patterns of motion lines on the light intercepting sheet 26 will be animated when the polarizer is rotated with the light passing therethrough.

Alternatively, the rotary polarizer, light intercepting sheet and analyzer can be situated in front of the sheet having the art work to be animated rather than behind as in FIG. 1. In this case the analyzer is bonded to the face of the art work and the light intercepting sheet bonded to the analyzer. The art work can then be viewed through the polarizer with animating results similar to those already described. In such an arrangement the picture to be animated also can be painted on a reflecting surface and the light source positioned in front of the picture or art work rather than behind. When this is done the analyzer can be eliminated. This latter arrangement is well suited for animating pictures on pages of educational books to add interest. The light shines on and is reflected from the page and the reader views the picture through a rotating polarizer. This arrangement also is well suited for animating outdoor billboards. A floodlight can be positioned on the ground in front of the billboard and a rotary polarizer associated with the floodlight to polarize the light.

In another type of arrangement the light intercepting sheet 42 having the analyzer and transparency bonded thereto to form the aforementioned three-ply lamination can be mounted in the window of a business establishment, such as a bank, gas station, supermarket, or the like, and a light mounted out of the way within the building in position to shine on the back of the lamination. A rotary polarizer is associated with the light source and the transparency will appear to be animated to one viewing the picture from outside the building. When it is desired to change the picture, a three-ply lamination having a different transparency can be mounted in the window in place of the previous one without changing the light source and polarizer. This arrangement makes it simple and economical for a business establishment to frequently change the animated displays.

Still another type of arrangement well suited for animating large pictures is to make the three ply lamination in the form of a small slide which can be inserted in a suitable projector for projecting the picture on a wall or a screen enlarged many times. A rotary polarizer can be associated with the projector so that the light beam from the projector passes through the polarizer to animate the enlarged projection on the wall or screen.

In lieu of the three-ply lamination wherein the analyzer is bonded to one face of the light intercepting sheet 42 and the transparency is bonded to the analyzer, a simplified construction can be employed in accordance with another embodiment of the invention. This construction employs a sheet of polyvinyl alcohol marketed by the Polaroid Company under the name "Vectograph" (also widely known as an H-sheet). This sheet is laminated to a sheet of Tenite acetate or cast acetate, for example, and a light intercepting stress pattern of embossed lines, such as that illustrated in FIG. 41 is embossed on the exposed face of the acetate sheet. A polarizing ink is then coated on the exposed areas of the polyvinyl alcohol sheet overlying the embossed areas. After the ink has dried the picture or art work to be animated can be painted directly on the polyvinyl alcohol face of the sheet and thus provide a simplified sheet construction which is equivalent to the three-ply laminated construction having the separate transparency, analyzer and light intercepting sheets bonded together by transparent adhesive. A suitable polarizing ink is marketed by the Polaroid Company under the name "Vectrograph Ink" or "H-ink" and reference is made to the book Polarized Light by William A. Shurcliff published by Harvard University in 1962 for a more detailed description of the above-mentioned sheet and ink products marketed by the Polaroid Corporation. Reference is specifically made to Chapter 4 of this book on Dichroic Polarizers and to pages 51 and 52 of Chapter 4.

Alternatively, the Vectrograph or H-sheet can be purchased from the Polaroid Corporation with the polarizing ink already applied to one face so that the entire sheet is polarized. This sheet can be laminated to a sheet of Tenite acetate or cast acetate and the exposed face of the acetate sheet embossed with the light intercepting stress lines as previously described. Thereafter a suitable, commercially available depolarizing liquid, like a saturated solution of sodium phosphate (Tri-base), can be coated on the nonembossed areas of the Vectrograph or H-sheet to depolarize these areas leaving only the areas overlying the embossed areas polarized. Of course, the reason for polarizing only the embossed areas is to eliminate the bright-dark effect that would otherwise be noticeable on the non-aminated portions of the transparency as the polarizer rotates.

Rather than depolarizing the non-embossed areas, the non-embossed areas simply can be cut out to enable the light to pass therethrough without being polarized, or certain patterns can be embossed on these areas to destroy the polarization thereof.

Figure 21:
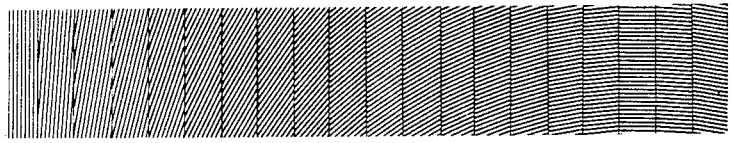
Figure 22:
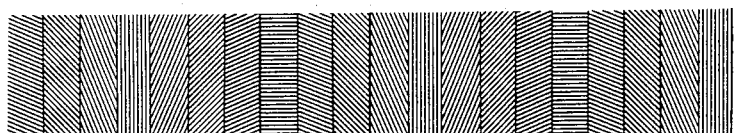

Referring to FIGS. 21-40, additional patterns of motion lines are shown which illustrate the almost infinite variety of motions that can be obtained in accordance with the present invention. FIGS. 21 and 22 illustrate a simple pattern for providing linear motion with the motion of FIG. 21 appearing much faster than that of FIG. 22 for a given speed of rotation of the polarizer because the pattern of FIG. 21 uses the same number of strips or sectors as used in FIG. 22 to provide one-quarter of the pattern. It will be observed that the lines at one side of FIG. 21 are parallel to the strip and the lines at the other side perpendicular to the strip with all of the lines on the intermediate strips being progressively angularly oriented between these two extremes. In FIG. 22 only three strips having angularly oriented lines are provided between the strips with vertical and horizontal lines. Therefore, the shadow line produced by the pattern of FIG. 21 will move from the vertical line strip to the horizontal line strip in response to rotation of the polarizer much smoother and in the same time that a shadow will move from a vertical line strip to a horizontal line strip in FIG. 22.

Figure 23:
Figure 24:
Figure 25:

The pattern of FIG. 23 will produce a wavy motion whereas the pattern of FIG. 24 will produce a wavy and reciprocating motion. The pattern of FIG. 25 will produce a reciprocating motion. It will be observed that this pattern is similar to the pattern of FIG. 6 but that the angle formed by the lines is about 45° rather than about 90° as in FIG. 6. The scattered pattern of FIG. 26 will produce a random or vibrating motion and the pattern in FIG. 27 a turbulent motion.

Figure 28:
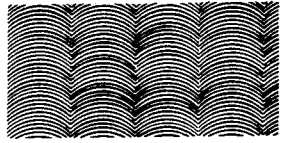
Figure 29:
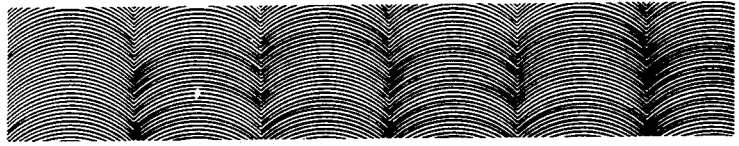
Figure 30:
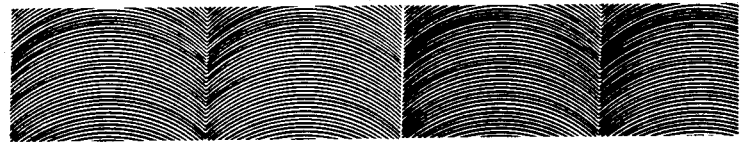

FIG. 28 illustrates another type of pattern for producing linear motion similar to that of FIGS. 21 and 22, which is smother and easier to produce. With the curvilinear pattern of FIG. 28, an elongated shadow will tend to move from one edge of each strip defined by the curved lines to the other edge as the polarizer rotates. FIGS. 29 and 30 illustrate the same pattern with each strip being wider than the strips of FIG. 28 so that for the same speed of rotation of the polarizer a faster linear motion will be produced.

Figure 31:
Figure 32:

FIGS. 31 and 32 illustrate similar but reversed patterns for producing segmented radially inward and outward movement, respectively, in each sector when the polarizer rotates in a clockwise direction. If the direction of rotation of the polarizer is reversed to a counterclockwise direction, the pattern of FIG. 32 will produce a radially inward movement in each section and that of FIG. 31 a radially outward movement. Also, if the pattern of FIG. 31 is embossed on a light intercepting sheet such as that illustrated in FIG. 41 so that embossed lines appear on both faces of the sheet, the direction of movement produced by the pattern can be reversed from radially inward to outward without changing the direction of rotation of the polarizer by simply reversing the sheet.

Figure 33:
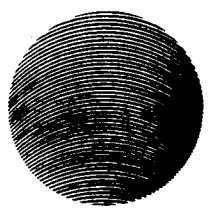
Figure 34:
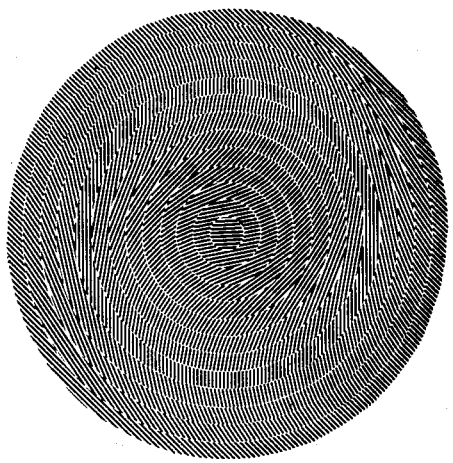
Figure 35:
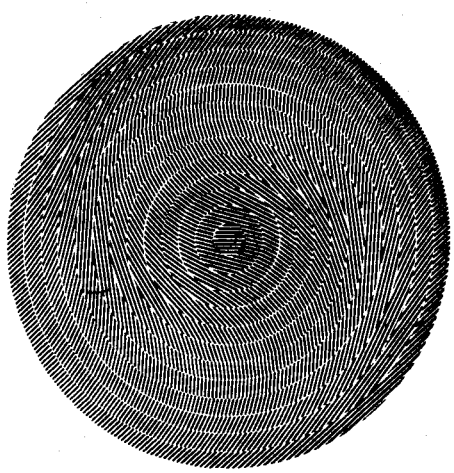
Figure 36:
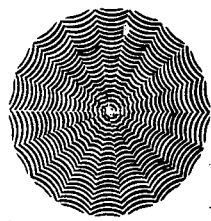
Figure 37:
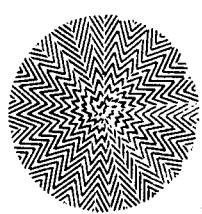
Figure 38:
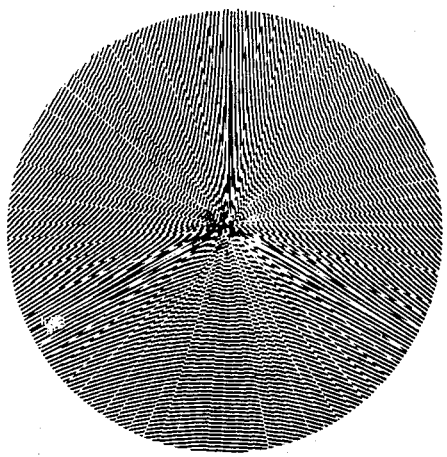
Figure 39:
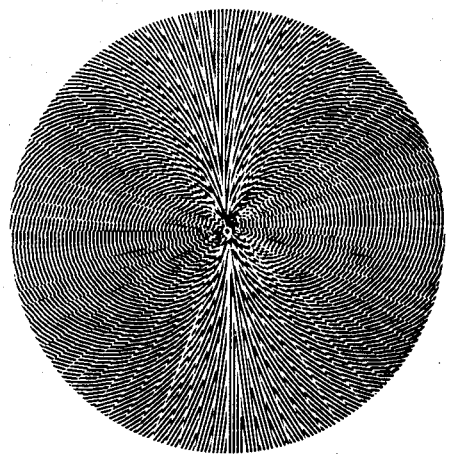
Figure 40:
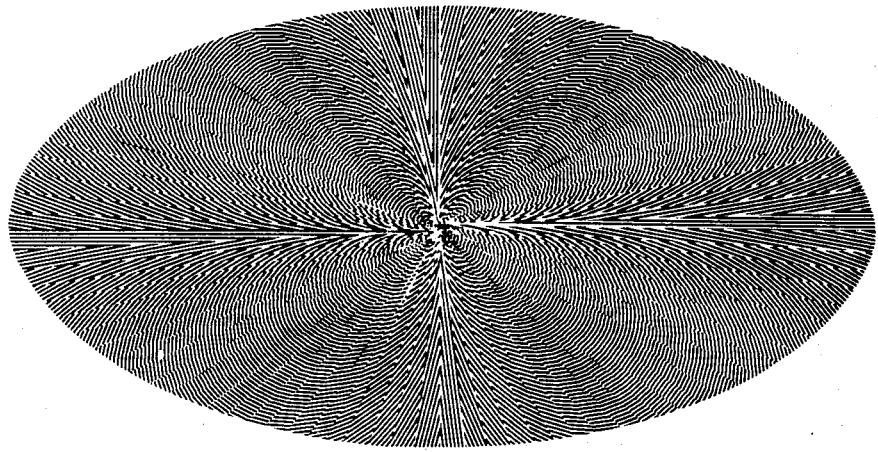

The pattern of FIG. 33 produces a rolling ball effect in which a shadow moves from one end of the curve lines to the other. FIGS. 34 and 35 produce a continuous radially outward and radially inward movement, respectively, for a given direction of rotation of the polarizer. FIG. 36 produces a slow reversed rotary motion, and FIG. 37 a hesitating rotary turn motion. FIGS. 38-40 illustrate still another pattern for producing rotary motion with the pattern of FIG. 38 producing the fastest motion in a reversed direction, the pattern of FIG. 39 a slower motion and the pattern of FIG. 40 a still slower motion.

It is apparent from the foregoing that almost any type or combinations of motions can be obtained by the present invention, including the many smoother motions provided by the curvilinear or circular patterns which cannot be duplicated by the prior art techniques described above. In producing embossed light intercepting sheets having the patterns of FIGS. 14-40, the exact number of embossed lines per inch is not critical. In practice about fifty embossed lines per inch are commonly employed with good results and this is the number of lines employed in the internal combustion engine pattern of FIG. 41.

While it will be apparent that the embodiments of the invention disclosed herein are well calculated to fulfill the objects of the invention, it will be appreciated that many changes, variations and modifications may be made without departing from the spirit of the invention as defined by the subjoined claims. The term "embossed" as used in the claims is intended to include not only ridges and depressions formed on the surface by the embossing operation described but also ridges or other superficial surface disturbances produced by other methods. For example, the motion lines could be formed on the surface of the light intercepting sheet as protruding ridges by a raised printing process and a metal coating deposited on one side of each of the raised lines as disclosed in the Patent 3,046,839 granted to G. R. Bird et al. on July 31, 1962. The process as disclosed in this patent produces a polarized sheet wherein the raised ridges are all parallel. By employing the teaching of the present invention to form the raised lines in a pattern of motion lines, it is apparent that an embossed light intercepting sheet will be produced which is equivalent to the analyzer of the first-mentioned prior art ararngement made up of separate polarized pieces, and that such an embossed light intercepting sheet can be employed with the rotating polarizer alone as in the first-mentioned prior art arrangement to produce the animation for the transparency. This eliminates the need for the separate analyzer which must be employed with the light intercepting sheet 26.

Although the preferred embodiment of the invention employs an embossed light intercepting sheet, it also is possible to practice the invention in its broadest sense by employing a light intercepting sheet which is not embossed. For example, a transparent sheet of material can have a pattern of opaque lines printed or drawn thereon corresponding to any one or a combination of the patterns illustrated in FIGS. 14–40, or a pattern of lines corresponding with the pattern for the internal combustion engine of FIG. 41. Such a printed transparent sheet can be positioned behind a transparency or other type of sheet having the art work thereon to be animated, and a transparent disc having parallel opaque lines with a line thickness and spacing substantially corresponding to the thickness and spacing of the lines on the printed transparent sheet can be employed in place of the rotary polarizer. With this arrangement the disc preferably should closely overlie the transparent sheet with the pattern of motion lines closely and when the disc is rotated, the art work will be animated. About 50 or more opaque lines per inch are preferably employed, and when a large number of lines per inch are used, such as 500 lines per inch, for example, moire fringes are produced when the lined disc is rotated. The movement of these fringes across the art work on the transparency similar to the shadows produced by the preferred embodiment employing the embossed light interceptor sheet and creates the illusion of animation. Of course, in this arrangement no stress lines are formed in the light intercepting sheet and no molecular orientation or re-orientation takes place as in the preferred embodiment having the embossed lines. The disc having the parallel opaque lines thereon is the equivalent of the polarizer, but no counterpart of the analyzer need be employed in this printed arrangement.

Where the term imprinted is used in the claims it is intended to broadly include both the preferred embossed light intercepting sheets and the printed sheets wherein the pattern of light intercepting motion lines is printed on the surface of a sheet of isotropic material without embossing the surface to in effect give it a birefringent character. Also, where the term polarize is used in the claims in combination with an "imprinted" light intercepting sheet, it is intended to include a disc having the opaque lines thereon as well as the polarizing material used in the preferred embodiment as the polarizer.

It is apparent that the photoengraved plate for embossing the light intercepting sheet 48 of FIG. 41 also could be covered with a suitable ink and employed to print the light intercepting pattern of motion lines for the engine 60, for example, without employing the heat and pressure required for embossing. Of course, it will be appreciated that the embossing or imprinting plate referred to above and in the claims does not have to be a flat plate, since cylinders and the like can be used for embossing or printing the motion lines on light intercepting sheets by a rolling operation, for example.

The term "imprinted" and "embossed" motion lines are used in the claims to define motion lines formed by pressure of a master die or plate on a surface of a light intercepting sheet so that the motion lines are a mirror image of the lines on the master die or plate.

What is claimed is:

1. In combination, a source of light; a rotatable polarizer; a layer of light transmitting material having a plurality of light intercepting patterns of motion lines embossed on different areas of a continuous uninterrupted surface of said layer, the pattern of motion lines on at least two of said areas producing different motions; and an analyzer, said layer of light transmitting material being positioned in the path of light from said source passing between said polarizer and analyzer.

2. A light-intercepting sheet for an animated display device comprising a layer of light transmitting material having oriented molecules and a predetermined pattern of motion lines embossed in one face thereof, the direction of orientation of said molecules being determined by the direction of said lines, said lines extending in a plurality of different directions so that said molecules are oriented in a plurality of different directions, whereby said light intercepting sheet can co-operate with a rotary polarizer and an analyzer to produce changing light and dark areas on said pattern depending on the angular position of said rotary polarizer relative to the direction of said lines.

3. The invention as defined in claim 2 wherein said light transmitting material is substantially isotropic.

4. The invention as defined in claim 3 wherein said molecules are oriented substantially perpendicular to said embossed lines.

5. The invention as defined in claim 2 wherein at least some of said lines are curved lines.

6. The invention as defined in claim 2 wherein said pattern of motion lines comprises closely spaced parallel lines with groups of said parallel lines being disposed at different angles relative to other groups of said parallel lines.

7. The invention as defined in claim 2 wherein said pattern of motion lines comprises a plurality of closely spaced radial lines.

8. The invention as defined in claim 5 wherein said pattern of motion lines comprises a plurality of pie-shaped sectors each having a common center and a plurality of concentric arcuate lines thereon, the center of curvature of the arcuate lines of each sector being spaced from said common center and located substantially on a line extending radially from the center through the sector.

9. The invention as defined in claim 5 wherein said pattern of motion lines comprises a plurality of closely spaced generally sinusoidal lines.

10. The invention as defined in claim 2, including in combination, a rotatable polarizer, and an analyzer, said light intercepting sheet being positioned in the path of light passing between said polarizer and analyzer.

11. The invention as defined in claim 10 wherein said layer comprises substantially isotropic material.

12. The invention as defined in claim 2 wherein said layer is a sheet of plastic material having an oriented polyvinyl alcohol laminate on one face thereof, said light-intercepting pattern of motion lines being embossed on areas of the other face thereof, the areas on said one face overlying said areas on said other face being covered with a polarizing ink.

13. The invention as defined in claim 12 wherein a picture is painted on said one face of said sheets with the areas thereof to be animated overlying the inked areas on said one face.

14. The invention as defined in claim 10 including a sheet having the picture to be animated painted thereon and positioned to be illuminated by said light after it passes through said rotatable polarizer and light intercepting sheet, the portion of said picture to be animated overlying said pattern of motion lines.

15. The invention as defined in claim 14 wherein said light-intercepting pattern of motion lines comprises closely spaced curved lines.

16. The invention as defined in claim 14 wherein said pattern of motion lines is embossed on different areas of said surface with the pattern on at least two of said areas being different from one another so as to produce different types of motions.

17. The invention as defined in claim 14 wherein said light-intercepting pattern of motion lines is embossed on a plurality of areas of said layer, the pattern of motion lines on at least two of said areas differing from one another so as to produce different motions.

18. The invention as defined in claim 17 wherein at least one of said patterns comprises closely spaced curved lines.

19. The invention as defined in claim 14 wherein the light-intercepting pattern of motion lines is embossed on a plurality of said areas of said layer, the pattern of motion lines embossed on at least four of said areas being different from one another so as to produce four different motions.

References Cited

UNITED STATES PATENTS

| | | | |
|---|---|---|---|
| 2,398,257 | 4/1946 | Schwartz | 40—106.51 |
| 2,700,919 | 2/1955 | Boone | 350—157 |
| 3,058,393 | 10/1962 | Ryan et al. | 350—155 |
| 3,213,753 | 10/1965 | Rogers | 350—167 |
| 3,225,457 | 12/1965 | Schure | 350—167 |
| 3,312,006 | 4/1967 | Rowland | 350—167 |
| 2,359,456 | 10/1944 | Young | 350—153 |
| 2,647,440 | 8/1953 | Rehorn | 350—153 |
| 3,054,204 | 9/1962 | Yates | 40—106.52 |
| 3,104,273 | 9/1963 | Ballance | 350—157 |
| 3,295,915 | 1/1967 | Eaves. | |
| 3,315,391 | 4/1967 | Lane et al. | |

DAVID SCHONEBERG, *Primary Examiner.*

P. R. MILLER, *Assistant Examiner.*

U.S. Cl. X.R.

350—153, 154, 157, 167; 40—106.51, 106.52